(12) United States Patent
Newlands

(10) Patent No.: US 10,951,814 B2
(45) Date of Patent: Mar. 16, 2021

(54) MERGING SATELLITE IMAGERY WITH USER-GENERATED CONTENT

(71) Applicant: Spelfie Ltd., Glasgow (GB)

(72) Inventor: Chris Newlands, Glasgow (GB)

(73) Assignee: SPELFIE LTD., Glasgow (GB)

( * ) Notice: Subject to any disclaimer, the term of this patent is extended or adjusted under 35 U.S.C. 154(b) by 70 days.

(21) Appl. No.: 16/230,645

(22) Filed: Dec. 21, 2018

(65) Prior Publication Data

US 2020/0195841 A1 Jun. 18, 2020

(30) Foreign Application Priority Data

Dec. 17, 2018 (GB) ...................................... 1820541

(51) Int. Cl.
| | | |
|---|---|---|
| *H04N 5/232* | (2006.01) | |
| *H04M 1/725* | (2021.01) | |
| *G06T 7/00* | (2017.01) | |
| *G06K 9/00* | (2006.01) | |
| *H04N 5/225* | (2006.01) | |

(Continued)

(52) U.S. Cl.
CPC ..... *H04N 5/23229* (2013.01); *G06K 9/00677* (2013.01); *G06Q 30/0261* (2013.01); *G06T 7/97* (2017.01); *H04M 1/72572* (2013.01); *H04N 1/00103* (2013.01); *H04N 5/2257* (2013.01); *H04N 5/265* (2013.01); *H04N 2201/3253* (2013.01)

(58) Field of Classification Search
None
See application file for complete search history.

(56) References Cited

U.S. PATENT DOCUMENTS 8,755,559 B1 * 6/2014 Dimitrov ........... G06K 9/00697
382/100
8,756,501 B1 * 6/2014 Karam .................... H04L 51/32
715/700

(Continued)

FOREIGN PATENT DOCUMENTS

EP 1324586 A1 7/2003
JP 2010130513 A 6/2010

OTHER PUBLICATIONS

English Translation of JP 2010-130513A provided by Espacenet machine translation tool.*

(Continued)

*Primary Examiner* — Jayanti K Patel
*Assistant Examiner* — Stefan Gadomski
(74) *Attorney, Agent, or Firm* — Maschoff Brennan

(57) ABSTRACT

There is provided a method for compositing remote sensing images (such as satellite images in visible light) with user generated content. An image capture device carried on a satellite platform is tasked to capture at least one remote sensing image of a geographical area within a predetermined time slot. The at least one remote sensing image is received at an interface portal along with at least one user-generated content, UGC, item. UGC items that have an associated location within the geographical area and that were captured within the time slot are merged, by the interface portal, with the remote sensing image to form a hybrid image. The interface portal and user device implementing the above method are described as is the system in which the method is implemented.

14 Claims, 13 Drawing Sheets

(51) Int. Cl.
*H04N 5/265* (2006.01)
*G06Q 30/02* (2012.01)
*H04N 1/00* (2006.01)

(56) References Cited

U.S. PATENT DOCUMENTS

| | | | |
|---|---|---|---|
| 2004/0066316 A1* | 4/2004 | Ogawa | G01C 21/3673 340/995.1 |
| 2006/0197781 A1* | 9/2006 | Arutunian | G01C 21/32 345/629 |
| 2007/0198641 A1* | 8/2007 | Dorai | H04L 51/14 709/206 |
| 2007/0226314 A1* | 9/2007 | Eick | G06F 16/986 709/217 |
| 2008/0043020 A1* | 2/2008 | Snow | G06T 17/05 345/427 |
| 2008/0168396 A1* | 7/2008 | Matas | G06F 3/04883 715/840 |
| 2011/0173193 A1* | 7/2011 | Ahn | G06F 16/2428 707/725 |
| 2012/0029812 A1* | 2/2012 | Altwaijry | G06Q 10/04 701/531 |
| 2012/0188411 A1* | 7/2012 | Jang | H04N 5/2621 348/239 |
| 2012/0226470 A1* | 9/2012 | Seymour | G01S 13/867 702/150 |
| 2013/0129307 A1* | 5/2013 | Choe | G06F 16/738 386/227 |
| 2013/0242135 A1* | 9/2013 | Muraki | H04N 5/23229 348/231.5 |
| 2013/0326425 A1* | 12/2013 | Forstall | G01C 21/00 715/851 |
| 2014/0064554 A1* | 3/2014 | Coulter | G06T 7/33 382/103 |
| 2014/0205189 A1* | 7/2014 | Cao | G06K 9/00657 382/160 |
| 2015/0242995 A1* | 8/2015 | Chang | G06F 16/29 345/419 |
| 2015/0257126 A1* | 9/2015 | Herz | G06Q 30/0643 455/414.1 |
| 2015/0261785 A1* | 9/2015 | Ma | G09G 5/377 345/629 |
| 2015/0371431 A1* | 12/2015 | Korb | G06K 9/00208 382/113 |
| 2016/0093020 A1 | 3/2016 | Basalamah et al. | |
| 2016/0148406 A1* | 5/2016 | Ghosh | G06T 11/00 705/313 |
| 2016/0300375 A1* | 10/2016 | Beckett | G06T 3/4092 |
| 2016/0306351 A1* | 10/2016 | Fisher | G05D 1/0016 |
| 2016/0357370 A1* | 12/2016 | Willey | G06F 3/0482 |
| 2016/0366294 A1* | 12/2016 | Uroskin | H04N 1/00493 |
| 2017/0034470 A1* | 2/2017 | Kleinrock | H04N 5/77 |
| 2017/0124378 A1* | 5/2017 | High | G06Q 10/06315 |
| 2017/0150060 A1 | 5/2017 | Herz | |
| 2017/0154130 A1* | 6/2017 | Dewell | G06Q 10/067 |
| 2017/0250751 A1* | 8/2017 | Kargieman | G06K 9/0063 |
| 2017/0365064 A1* | 12/2017 | van 't Woud | G06T 7/11 |
| 2018/0024250 A1* | 1/2018 | Nishi | G01S 19/48 342/357.62 |
| 2018/0146214 A1* | 5/2018 | Burgett | H04N 19/186 |
| 2018/0180768 A1* | 6/2018 | Wolf | G01J 3/00 |
| 2018/0231668 A1* | 8/2018 | Xia | G01S 5/08 |
| 2018/0260648 A1* | 9/2018 | Yang | G06K 9/00651 |
| 2018/0310124 A1* | 10/2018 | Regan | B64G 1/1085 |
| 2019/0333285 A1* | 10/2019 | Delia | G06T 17/00 |
| 2020/0007224 A1* | 1/2020 | Hawthorne | H04W 72/0446 |

OTHER PUBLICATIONS

Notification of Transmittal of the International Search Report and the Written Opinion of the International Searching Authority, or the Declaration dated Apr. 8, 2020, (12 pages).

* cited by examiner

MERGING SATELLITE IMAGERY WITH USER-GENERATED CONTENT

TECHNICAL FIELD

The present disclosure relates to a method and system for generating composite images.

BACKGROUND

The ubiquity of mobile telephones and their increasing connectivity is, at least in part, tied to the mass adoption of social media services by their users. Mobile telephones having built-in camera functions (and in particular smartphones) enable a social trend toward near-instantaneously shared experience. Many social network services encourage the sharing of photographic images (still and video) captured using the mobile's camera(s).

Smartphones commonly have both a front-facing camera (i.e. facing the user when the user looks at the phone's screen) and a rear-facing camera, so that it has become very simple for the user to operate the camera function to capture an image of themselves in a "selfie". The term selfie is commonly used to refer to any photograph taken by, and including, the photographer; often the photographer intends to photograph themselves alongside other people, and/or with animals, scenery, architecture, etc. More recently, certain mobile manufacturers have introduced enhanced selfie-like functions, such as the facility to take "bothies"—a "bothie" combines the images captured by each of these cameras in a single composite image).

Selfies allow the user to memorialise otherwise ephemeral real-time experiences, placing the user in the context of an event that may be personal, limited to the user's friendship group or more globally shared.

Outdoor experiences, such as rock concerts, sporting events, national and religious events, even natural phenomena, often involve a great many participants and movement across a geographic area. It can be difficult to depict the scale of such events and the context of the individual within them. The selfie allows a personal snapshot of the photographer at an event but may not adequately reflect where the individual is or how that location relates to the fleeting moments that make up the event. It is entirely possible to take a selfie at an event but to find that the selfie does not begin to capture the excitement and uniqueness of being present at that event at that moment.

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

It is an object of the invention to at least ameliorate one or more of the above or other shortcomings of prior art and/or to provide a useful alternative.

SUMMARY OF THE INVENTION

The invention is a method and apparatus as defined in the appended claims.

It will be appreciated that features and aspects of the present disclosure may be combined with other different aspects of the disclosure as appropriate, and not just in the specific illustrative combinations described herein.

BRIEF DESCRIPTION OF DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DESCRIPTION OF EXAMPLE EMBODIMENTS

Figure 1:
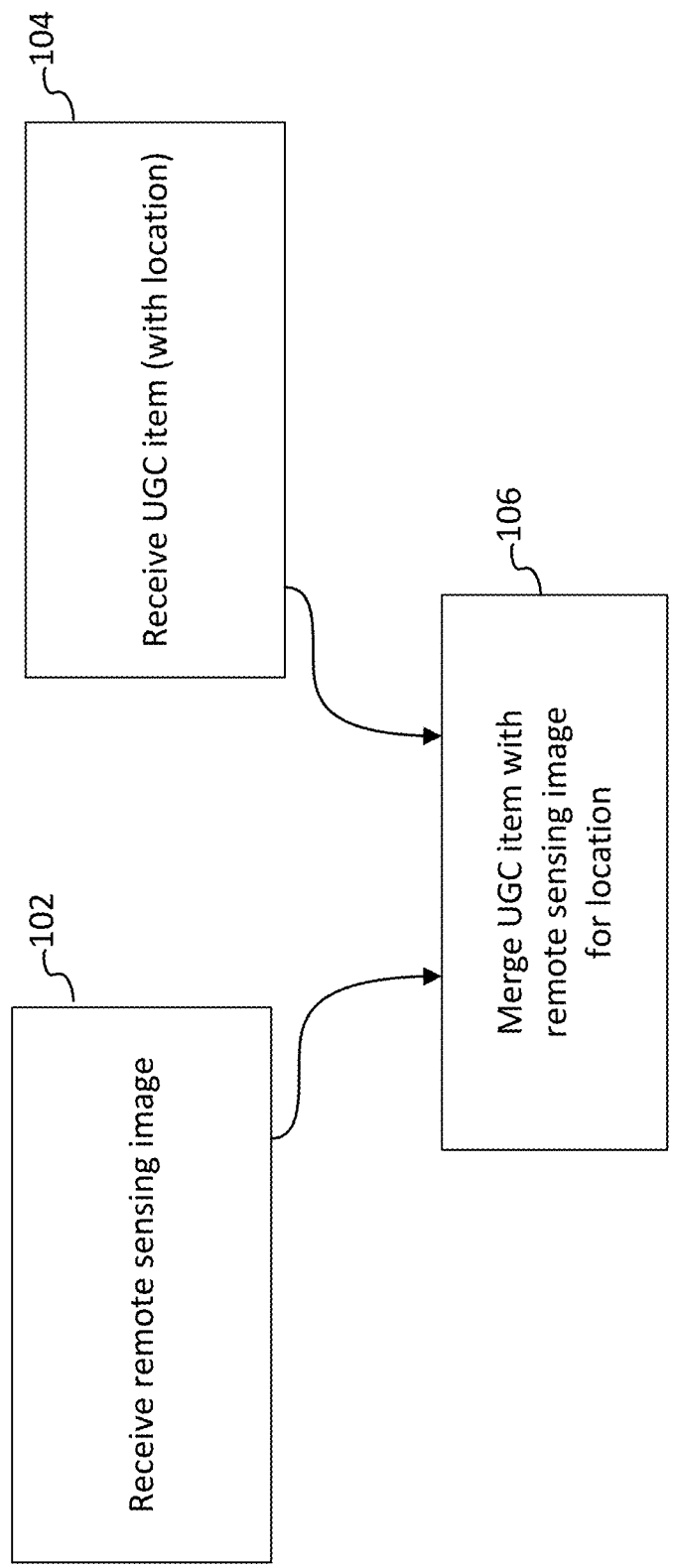
FIG. 1 schematically illustrates the flow of operations in accordance with an aspect of the present disclosure.

The detailed description set forth below in connection with the appended drawings is intended as a description of various exemplary embodiments of the disclosure and is not intended to represent the only forms in which the present disclosure may be practiced. It is to be understood that the same or equivalent functions may be accomplished by different embodiments that are intended to be encompassed within the scope of the invention. Furthermore, terms such as "comprises", "comprising", "has", "contains" or any other grammatical variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprise the element or step.

The present disclosure seeks to blend the personal context of an event-goer captured in user generated content (such as a selfie, bothie or the like) with a relevant and inclusive overall image that nevertheless relates to the shared experience of the event-goer at a moment in time and a precise location.

The user of the internet is increasingly familiar with the ease of "mash-ups" between library map data and geo-location information stored as metadata to media content such as still and video images obtained by image capture devices. Furthermore, it has become conventional for mobile devices such as smartphones and wearable devices (particularly smartwatches) to incorporate a satellite positioning system unit (using technologies such as GPS, GLONASS, and/or BeiDou, for example) capable of providing an accurate geo-location for the device. As a result, media content (e.g. user generated content, UGC) generated by such devices may have associated metadata providing a geo-location of the device at the time the content is captured.

Thus, where a user takes a selfie, the user's device may be configured to append geographical coordinates to metadata of the selfie (along with other information such as a time stamp and/or camera settings). The selfie could then be associated with a location in a map offered by a mapping service, using the associated geographical coordinates. The mapping service might access a library image of the location and the surrounding region at a predetermine resolution. The library image might be: schematic, showing features of interest to a traveler such as roads, rivers and places; geographic, showing natural features and (altitude) contours of the landscape; or aerial views, often themselves captured from imaging platforms such as aircraft, unmanned aerial vehicles (UAV) or satellites.

Aerial view library images are typically obtained from historical data. Satellite images are available of the overwhelming majority of the Earth's surface but they are not typically renewed regularly: even populated regions may be represented by satellite images that were taken some years previously. Recent changes to locations may evade capture in such image libraries, for example the appearance and disappearance of short-duration phenomena such as the temporary camp surrounding an outdoor music festival or snow cover in a territory that rarely experiences sub-zero temperatures. Furthermore, the images of an area in such libraries may be assembled from images captured by different techniques, from different imaging platforms and at different resolutions/exposures/illumination angles: this can often lead to library imaging of a particular geographic region being inconsistent. Weather phenomena such as cloud formations can mean that the land surface of some regions is not visible in the available library images.

In many events, the use of UAVs (also referred to as "drones") is discouraged (or banned outright) on the grounds of safety for event-goers. Likewise, the use of manned imaging platforms such as helicopters can introduce an unnecessary risk as well as contributing unwelcome noise, and if they are sufficiently low-altitude, down-draft effects.

While mobile phone users have become accustomed to near instantaneous images being captured by their mobile devices, they are often unable to combine these snapshot images (whether still or video) with a meaningful remote image that represents their experience.

In the case of a user attending an outdoor music festival in a muddy field in rural England, the ability of a mapping service to provide an image of that field, captured some years ago on a sunny spring day, will result in a disappointing and inaccurate representation of the lived experience.

Satellite platforms for remote sensing and imaging equipment are often arranged to orbit the Earth so that they pass directly over different regions of the Earth's surface (i.e. they are not usually "geostationary"). It is possible to arrange for an imaging device borne by a satellite to target a geographical strip at a particular time (capturing one or more images of that strip), where the strip of the surface is a region of the Earth within a predetermined acute viewing angle from the normal substantially under the path of the satellite. The instructions for scheduling a targeted satellite activity are instances of a more general category of instructions between ground systems and the operational functions of the satellite known as "tasking" the satellite; however, unless the context requires otherwise, the term "tasking" used herein refers to image capture scheduling instructions.

By providing a facility in which an event organiser or sponsor may task the capture of remote sensing images of a predetermined region in a prearranged timeslot, and a facility allowing one or more users to obtain their own respective UGC at a time within the timeslot while they are located at a location within the predetermined region, the user (or more likely a plurality of users) may (each) be provided with a satellite snapshot of the geographic region where the UGC is captured that represents the overall aerial view of the region at the time the UGC was captured. Participating users may be identified through registration with a satellite-selfie service and authenticated use of a corresponding service application (e.g. an "app") on their device based on their registration.

Thus, while attending the mud-affected English music festival, the user may be instructed (by their app) to be ready for a "satellite selfie" image to be taken by the satellite overhead, in a scheduled timeslot, for the five minutes between 12:30 to 12:35 on the Saturday of the music festival, say. The user is encouraged to take a selfie of herself with a group of her fellow concert-goers during the scheduled timeslot—the selfie including a GPS location reading from the user's mobile phone at the time the selfie was taken. The GPS location may then be used to identify the user's accurate position in an image of the muddy, festival field as it was when the selfie was taken (i.e. allowing the selfie image taken during the event/venue to be synchronised with satellite photographs of the event/venue).

Satellite tasking has typically been considered the sole responsibility of the satellite owner in the past due to the complexity and proprietary nature of the operation of a satellite system, the sensitivity of the satellite equipment and the monetary cost of the associated maintenance, monitoring and scheduling tasks. As a result, there has been no requirement for third party satellite tasking.

In certain embodiments, the app may notify a user (registered with a satellite-selfie service) that a suitable satellite is overhead and the user himself (through his device) may provide the instruction tasking the satellite to capture satellite imagery: effectively requesting a satellite-equivalent of a selfie. In this case, the location information for the user's device and the current time may be used to calculate whether the satellite is due to be in a position where remote image capture of the user's location is feasible. As above, a satellite image is captured of the user's location (i.e. the location of the location unit associated with the user's device) at the time of the transmission of the user instruction during an event that has provisioned or subscribed to the service.

Whether the user or the event organiser tasks the satellite image capture, the user can be notified of the window in time during the event when the service is available (i.e. the satellite is overhead) and can perform a content generation action. Where the time of the satellite image capture is set by the event organiser (when the organiser is tasking the satellite), the content generation action may include the action of taking a selfie during the window of time and determining an associated geo-location.

The content generation action may be automated by the app on the device to occur at a time pre-set by the user (so that the user knows the selfie will be taken at the same predetermined time the satellite image capture is tasked to occur) or by an event controller transmitting a signal from event systems. Alternatively, the user could manually send the request e.g. by using the app to take a conventional selfie, that action then acting as the tasking trigger for the satellite (or pseudo-satellite) image capture. In the latter case, there may be a significant time difference between the time of the conventional selfie and the time at which the tasked satellite is able to respond to the tasked instruction, due to latency in the processing of the tasking trigger.

Where an event controller issues a content generation trigger signal, that is used to instruct the user device (e.g. to take a selfie) and to task the satellite, it can be arranged that this signal is transmitted to different user devices at slightly different times: staggering the trigger transmission ensures that the satellite's tasking system is not overloaded.

One benefit of the method of the present disclosure, in this example, is that it facilitates a far truer depiction of the user's experience of an event.

FIG. 1 schematically illustrates the flow of operations in accordance with an aspect of the present disclosure.

In functional block 102, at least one remote sensing image of a predetermined geographical area is received from an image capture device carried on a satellite platform. The image capture device having been tasked to capture the at least one remote sensing image within a predetermined time slot.

In functional block 104, a user-generated content, UGC, item, is obtained. The UGC item has an associated location within the geographical area and will have been captured at a user-determined time within the time slot. In certain cases, the UGC item further includes a still image, such as a selfie.

It is noted that the operations in functional blocks 102 and 104 may be performed in either order, or they may indeed be performed substantially simultaneously.

Once both UGC item and remote sensing image become available, the operations of functional block 106 are performed, merging the UGC item and the remote sensing image to form a hybrid image.

The hybrid image associated with a short-duration event can then be shared, through social networking and other communication services: the hybrid image has both social and evidential value (e.g. the user has tangible evidence that they were really there at a given event, as seen in the selfie or other UGC item in amongst a crowd of attendees, that can be seen in the associated satellite image). Examples of UGC items include video content, sound recordings, heart rate traces, biometric readings, etc., from the user. Optionally, further content and metadata may be associated with the hybrid image, for example additional multimodal media content (such as "official" video footage, concert programme listings, additional environment/weather readings, commercial offers, shared UGC from other users, etc.) and processing effects (such as a zoom-in effect or the addition of filters or "skins" to the hybrid image).

Figure 2A:
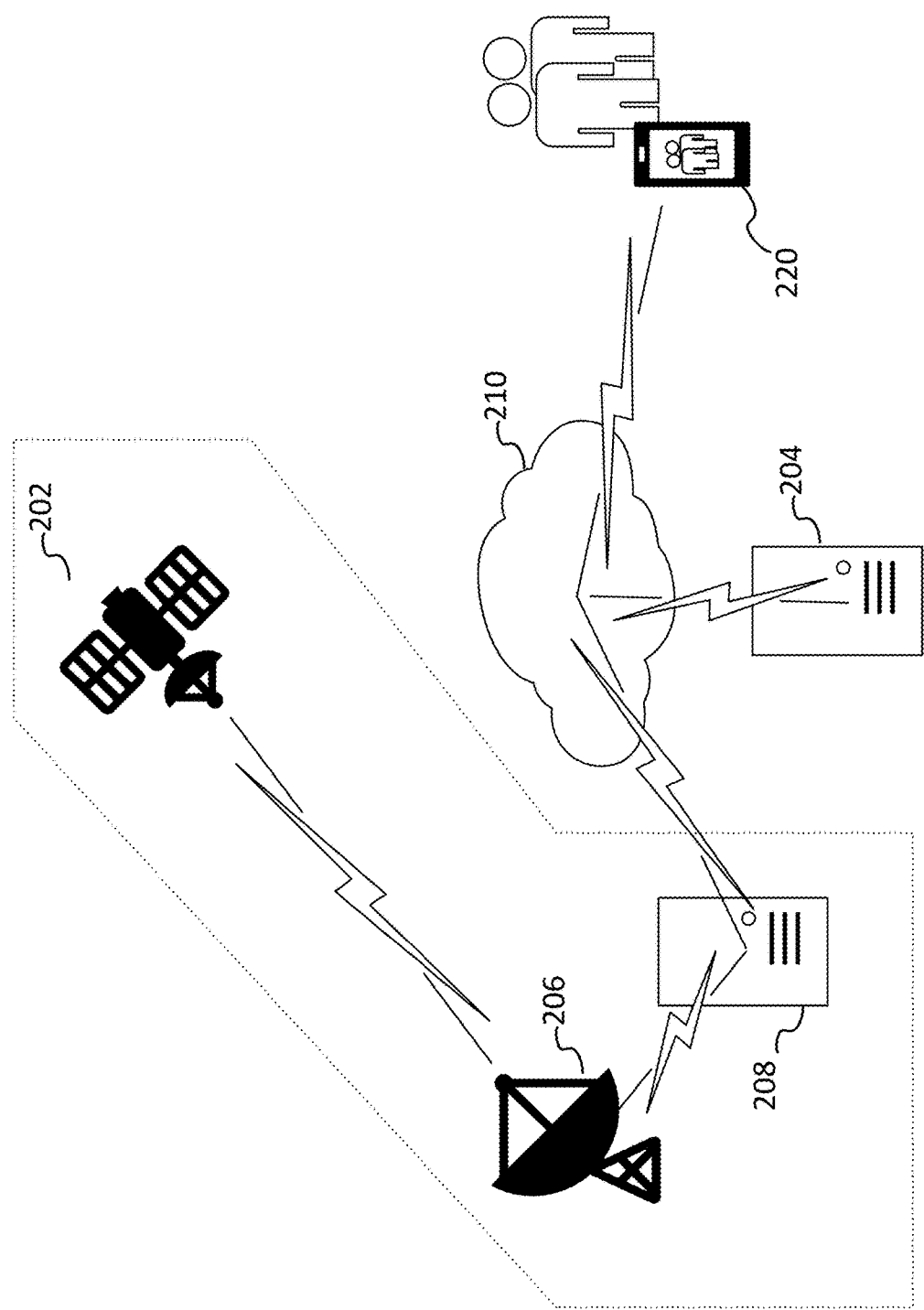
FIGS. 2A and 2B illustrate two different scenarios in which the method of the present disclosure may be implemented.
Figure 2B:
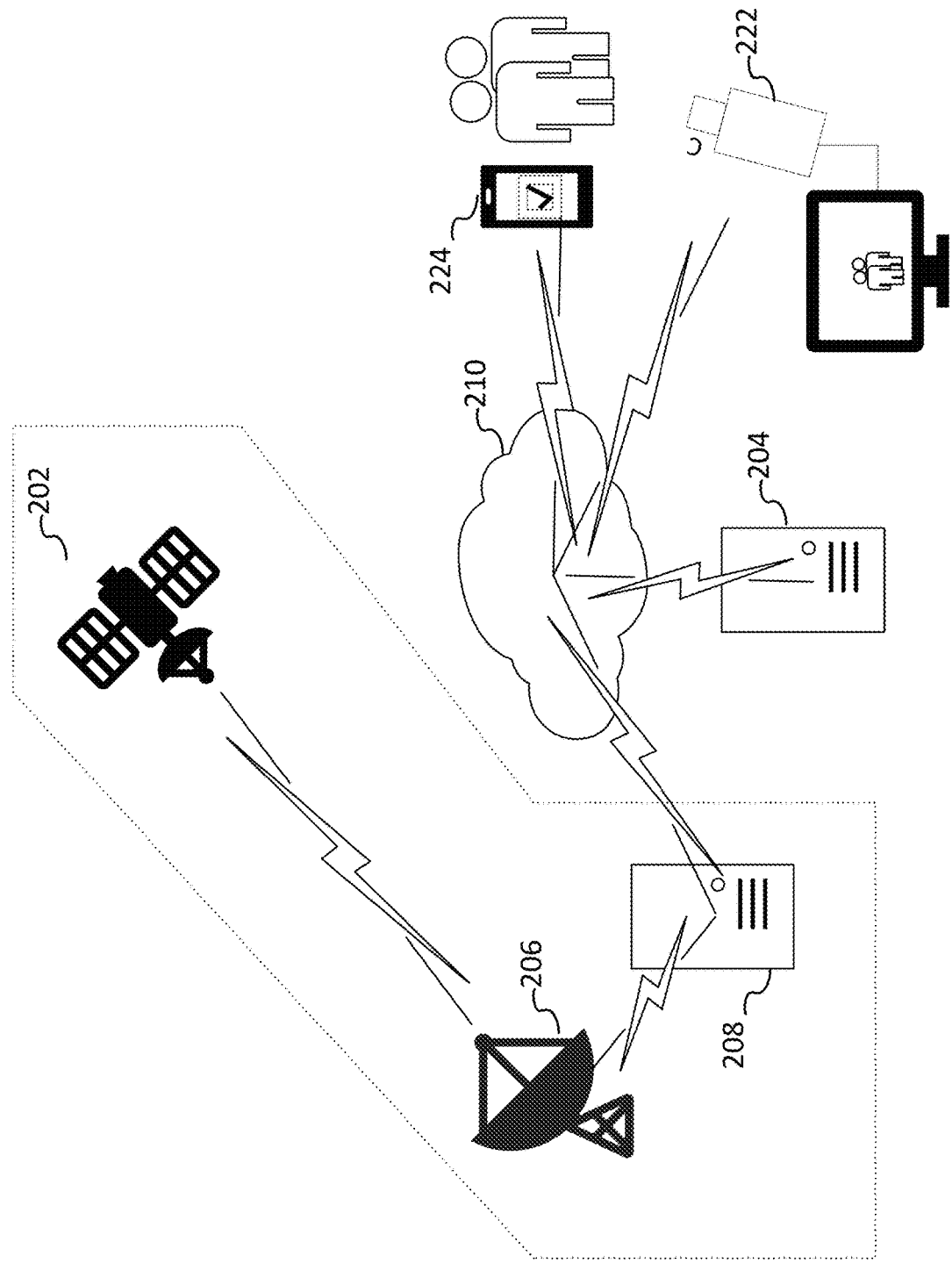

FIGS. 2A and 2B illustrate two different scenarios in which the method of the present disclosure may be implemented.

FIG. 2A shows a satellite 202 (i.e. a remote imaging platform) having a communication link to an interface portal 204 (via an antenna 206, a ground station 208 and a communications network 210). The interface portal 204 is also in communication with a user device 220 (here, a smartphone or a tablet computer incorporating a media content unit and a geo-location unit). Images captured by the media content unit of the user device are stored with location information determined at the time of the image capture. Provided the image capture time and location are each with a range of predetermined values associated with an event, an application executing on the user device may transmit the captured media content to the interface portal via the communications network. The transmission of captured media content need not be instantaneous: in the case of a tablet computer, for example, the content may be captured but transmission may be postponed until the tablet is in range of a suitable communication connection (for a tablet computer lacking cellular communication functionality, this may mean waiting until a publicly accessible WiFi connection is available before transmission is possible).

FIG. 2B also shows a satellite 202 having a communication link to an interface portal 204 (via an antenna 206, a ground station 208 and a communications network 210). The interface portal 204 is also in communication with a user device 224. The user device 224 is in communicative contact with an external media content unit 222 (here, an event camera). Either the event camera or the user device may be communicatively coupled to a geo-location unit (not shown), from which location information is obtained.

The external media content unit 222 may advantageously be portable or provided on a non-fixed platform, e.g. mounted on a rail mount, a cable mount or a UAV/drone. In such cases, the external media content unit 222 may conveniently be collocated with a geo-location unit.

Alternatively, the external media content unit 222 may have a known fixed location (as would be the case for cameras located in a sports stadium). Images captured by the media content unit 224 are stored with location information determined at the time of the image capture. An application executing on the user device 224 may instruct the transmission of the captured media content from the media content unit 222 to the interface portal 204 via the communications network 210, provided the image capture time and location are each with a range of predetermined values associated with an event.

Facial recognition may be implemented so that the external media content unit 222 may capture an image of the user in the crowd, identify him and capture a personalised image. Alternatively, the external media content unit 222 may be instructed to capture an image of a fixed location (for example, a meeting point or performance area location or a predetermined seat, in each case the location having a fixed position relative to the external media content unit 222 and thus a unique imaging angle. In each case, the user device 224 triggers the image capture through the communicative contact with the external media content unit 222.

In a first embodiment of the present disclosure, the system that allows the method of the present disclosure to be implemented includes a media content unit for obtaining media content, a unit for providing a geo-location to be associated with the media content (this may be integral in the media content device), a user device (typically a mobile telephone) executing a mobile application, a remote imaging platform, a portal for interfacing with the or each user, as well as the remote imaging platform and with at least one administrator.

Examples of media content unit include cameras (for both still and video capture), audio recording devices, heart rate monitors, and biometric sensors.

Examples of geo-location units include satellite positioning system units (using technologies such as GPS, GLONASS, and/or BeiDou, for example) and cellular communication units (capable of locating a device within a cellular network using conventional cell ID techniques).

In certain embodiments the media content unit and/or geo-location unit are provided within the user device. The mobile application provides a user interface to the interface portal.

The remote imaging platform is advantageously a satellite or a pseudo-satellite. An example of a suitable pseudo-satellite is a device known as a stratospheric UAV, which may remain aloft over a predetermined geographic area for extended periods (e.g. of the order of weeks). Such pseudo-satellite platforms are typically operated at altitudes significantly higher than commercial air transport, where operations are not considered a security or safety risk to users on the ground. In the following description, reference to remote imaging platforms and satellites includes conventional geostationary and orbital satellites as well as high altitude pseudo-satellites.

The operations illustrated in FIG. 1 are performed by the interface portal. The portal includes at least one processor, which executes instructions to implement the method of the present disclosure. The interface portal may advantageously be implemented in one or more than one networked servers. The instructions may include instructions for a platform application programming interface (API), a management portal and a processing application.

The platform API is arranged to perform a number of services. It must facilitate the exchange of data between database and the various systems/devices (including the management portal, processing application and associated application queues, product delivery databases, the mobile application and other external services such as external satellite tasking, delivery systems and file storage (for uploads and assets), and the content database).

In particular, the platform API may be configured to manage the user accounts for the (or each) user of the system. The user may then register a new account, update a corresponding user profile for that account, as well as login and logout from that account to sign up to participate in any given satellite image opportunity (or group of such opportunities) associated with an event they are attending.

The platform API also provides access to an events database, detailing the location and timing of the events and whether the user is permitted access to this information. Event records in the events database may be configured as "invitation only" or "upon request" for example: so that access to the event information may be restricted to particular users (or groups of users) at the behest of an administrator. The platform API may also facilitate the handling of those event signups and/or the issuing of invitations to one or more users.

Media content obtained by the media content unit may be received by the interface portal via a communication facility (this facility may handle the upload and download of selfie images and other user generated content, for example, from user devices to the interface portal).

The platform API is also provided with a facility for integration with the operations of the remote imaging platform. The remote sensing images captured by the remote imaging platform are received by the interface portal via the communication facility.

In certain embodiments, the platform API may be responsible for retrieval of additional content such as video embed code for sharing and for the retrieval of user generated content from social networking services, from the user's own historical data and/or from the historical data of other users that has been shared with the user.

Media content may not be in a format suitable for immediate sharing. The platform API is provided with a facility for passing media content that has been obtained from user devices to the processing application for processing. The platform API also monitors the status of the processing of this content so that the user (and administrators) may check the status.

The processing application may provide services including a scheduler service, queuing and processing services, data storage integration, messaging (including mobile and web-based push notifications), image processing/generation, and video processing. The processing application may be standalone and scalable to a plurality of servers within the interface portal. The processing application may include a plurality of schedulers including the upload poller and may additionally read instructions from an associated application queue, and carry out image and video processing tasks. The processing application may advantageously be implemented as logically separate, dedicated still image and video processing applications.

In certain embodiments, the user experience is mediated by the management portal executing on the interface portal. Through the management portal, an administrator may manage content related to events including metadata, text, video, images which will be delivered via the platform API and may allow advertisers and event organisers to provide updated information, including event scheduling and commercial offerings, for dissemination to users. The management portal includes a facility for managing login from the administrators, event organisers and advertisers (collectively referred to as partners) and for managing the records in the events database (allowing their creation, updates and transmission of invitations). The administrator may be given "super user" rights, so that new partners can be added to the platform and their accounts can be managed.

In certain embodiments, the management portal serves as an interface with the satellite service allowing the tracking of the satellite, the performance of an availability check. This interface includes a facility for satellite tasking, necessary for coordinating the remote imaging of an event with the actions of one or more users attending that event.

In the user device, the mobile application includes features for user registration and login and for viewing information about past and upcoming events for which the enhanced selfie experience is available.

The mobile application maintains a list of upcoming events and the corresponding details of those events.

Through the application, the user may register to join (i.e. participate) in one or more such events, whether by responding to an event invitation from the portal API or as a user-originating request.

Where the user has participated in previous events, the application may store details of those events and associated hybrid images.

In certain embodiments, the application generates active event updates and may present a countdown so that the user is made aware of the imminence of the next slot at which user generate content generation can be coordinated with a pass by a suitably tasked remote sensing platform (i.e. satellite).

In certain embodiments, the application facilitates communication with an external media content unit (i.e. an image capture device, for example the camera of an official photographer or of an event photo booth): the application, then, may be provided with a user interface that allows the user to trigger image capture in the external image capture device and/or to request an image obtained by such a device. In other embodiments, the application is logically coupled to an in-built camera function of the user device and facilitates a selfie capability.

In certain embodiments, the geo-location unit is external to the user device. In other embodiments, the user device incorporates the geo-location unit. In each case, the mobile application is arranged to access the location information generated by the geo-location unit and to use this information in the provision of location-based features, such as event mapping, location meta-tagging and 'geo-fencing'.

The mobile application may be arranged to receive push notifications related to the event and the status of processing of hybrid images at the interface portal.

The mobile application may be provided with a social networking service interface so that hybrid images can be uploaded and shared to (as well as downloaded to) third-party services such as Facebook®, Instagram®, Twitter®, etc.

In certain embodiments, the hybrid image may be extended by inclusion of data from at least one additional remote sensing image. This may allow the user to pinpoint his location in more than one image of the event, even to select a preferred image (as he might wish if a cloud or kite obstructed the view for one of the remote sensing images). While the additional remote sensing image may be captured from the same satellite platform, even the same image capture device, certain embodiments have the remote sensing image captured from a further image capture device on the same satellite platform (e.g. an infrared image taken alongside the conventional visible light image) and other embodiments have the remote sensing image captured from an image capture device on a different platform entirely. That different platform may be a second satellite platform; a UAV platform; a manned aircraft platform; or even an event camera on a gantry.

In certain embodiments, the hybrid image may be extended by inclusion of data from a historical source. Thus, historical aerial and satellite images of the geographical area may be obtained as historical remote sensing images. The inclusion of historical remote sensing images along with the near-real-time hybrid images means that the resulting compound multimedia item can depict not only the experience of being at an event but also the ephemeral nature of the event.

Where the event relates to an organised beach-cleaning event, for example, the resulting compound multimedia item may illustrate the results of the even-participants activities through a sequence of before-during-afterwards images while also placing the user within the event.

The various steps in the method illustrated in FIG. 1 are set out in more detail in FIGS. 3-8, described below.

Figure 3:
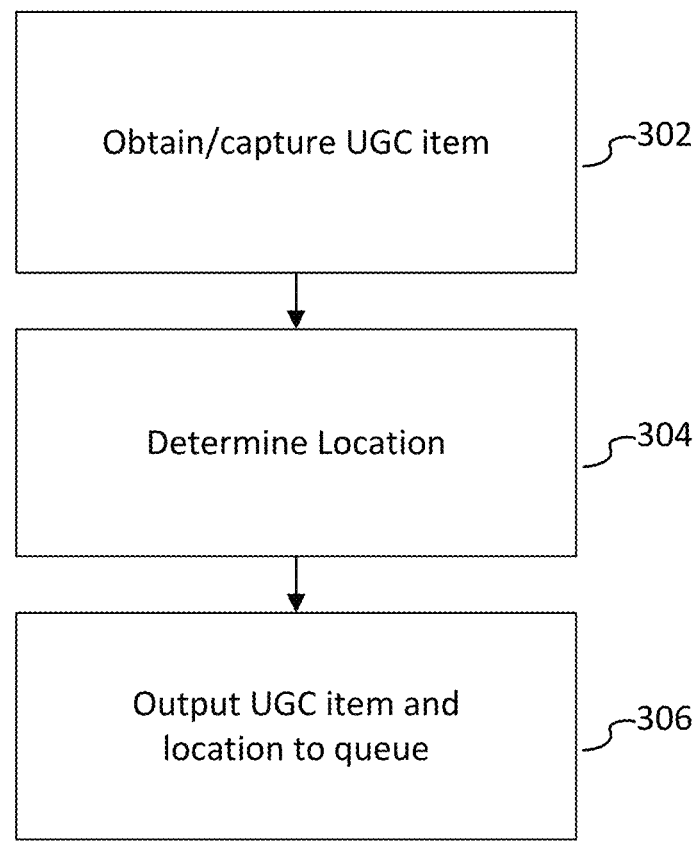
FIG. 3 illustrates the operation of a mobile application executing in the or each user device when obtaining a user generated content item in accordance with an aspect of the present disclosure.

In FIG. 3, the operation of the mobile application executing in the or each user device is illustrated. At step 302, the user device either captures a user generated content item (or obtains a content item captured by an external media content unit upon instruction from the user). A location of the user device (or the media content unit) is determined at step 304. In certain embodiments, location is determined by an external geo-location unit; in other cases the geo-location unit is integral to the user device.

The user device then queues the UGC item (with its associated location information) for upload to the interface portal, in an application queue. Alternatively, the UGC item may be queued for upload directly from the media content unit. In certain embodiments, the user device or media content unit may operate to upload the UGC item to a queue in the interface portal itself or in a dedicated queue proxy communicatively coupled to the interface portal.

Figure 4:
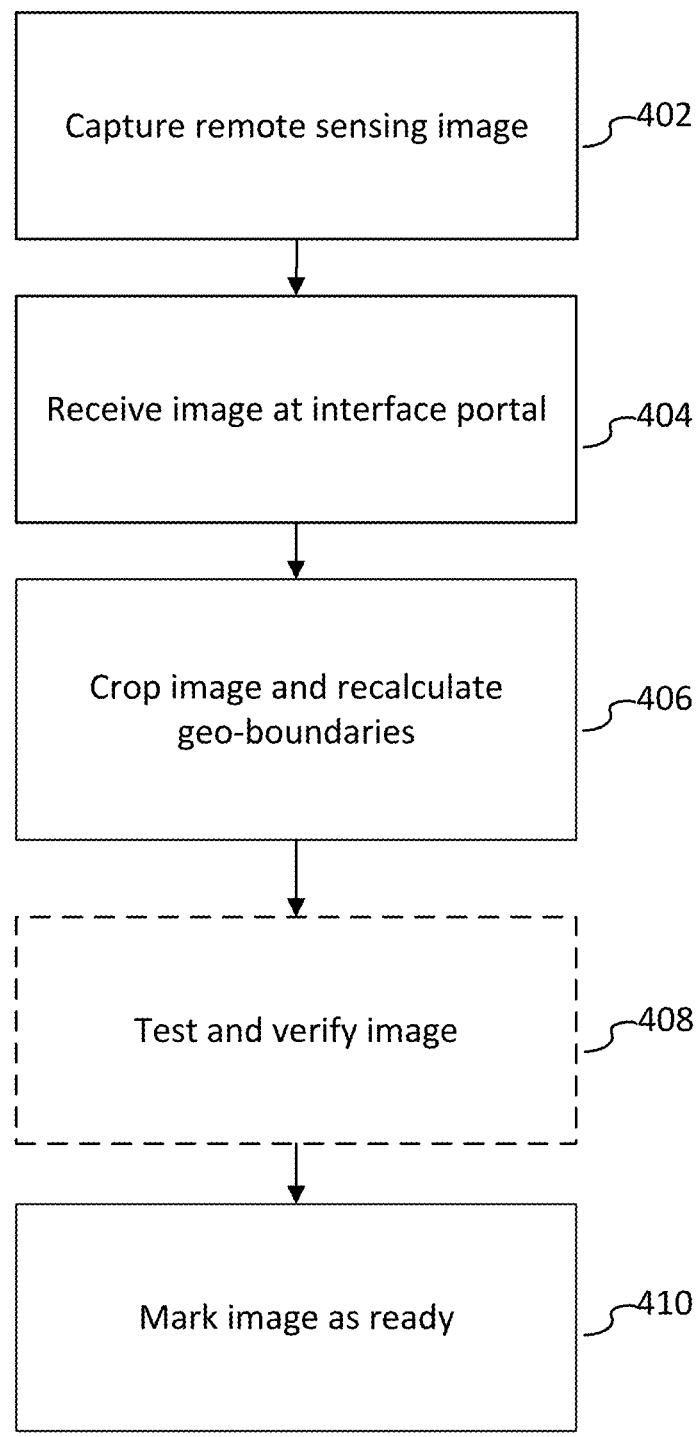
FIG. 4 schematically illustrates certain operations performed in accordance with an aspect of the present disclosure.

FIG. 4 sets out the operations at the remote imaging platform and in the interface portal in more detail.

One or more remote sensing images are captured (by an imaging device carried by a satellite) of a predetermined region of the Earth's surface at a time coinciding with an event, step 402.

The or each remote sensing image is transmitted from the satellite (via intermediate ground station and network nodes) to the interface where it is received, step 404.

The image is then processed for use in the enhancement of the UGC items, step 406. The image may be cropped to cover a specific geographical area, and depending upon the angle from which the satellite viewed the target area (compared to the vertical, when the satellite is directly over the target area) the remote sensing image may also be orthorectified (i.e. processed into a map projection so that the spatial coordinates accurately overlap the coordinates in conventional 2D maps).

Optionally, the interface portal (through the processing application) may apply routines to test the resulting image and to verify that the satellite image fulfils usability requirements, step 408 (this may include applying a score to each image of a series of similar images of the same event/time). Where a plurality of images are available and cloud cover is determined to affect some images in a first region of the image and other images in a second region, different from the first region, this may mean that only images unaffected by cloud cover in the region including a predetermined location (such as the reported location of a user) will be verified for use.

Once processing is complete, the resulting image (or images) are marked as ready, step 410. The marked images may be stored in the interface portal for future use.

Figure 5:
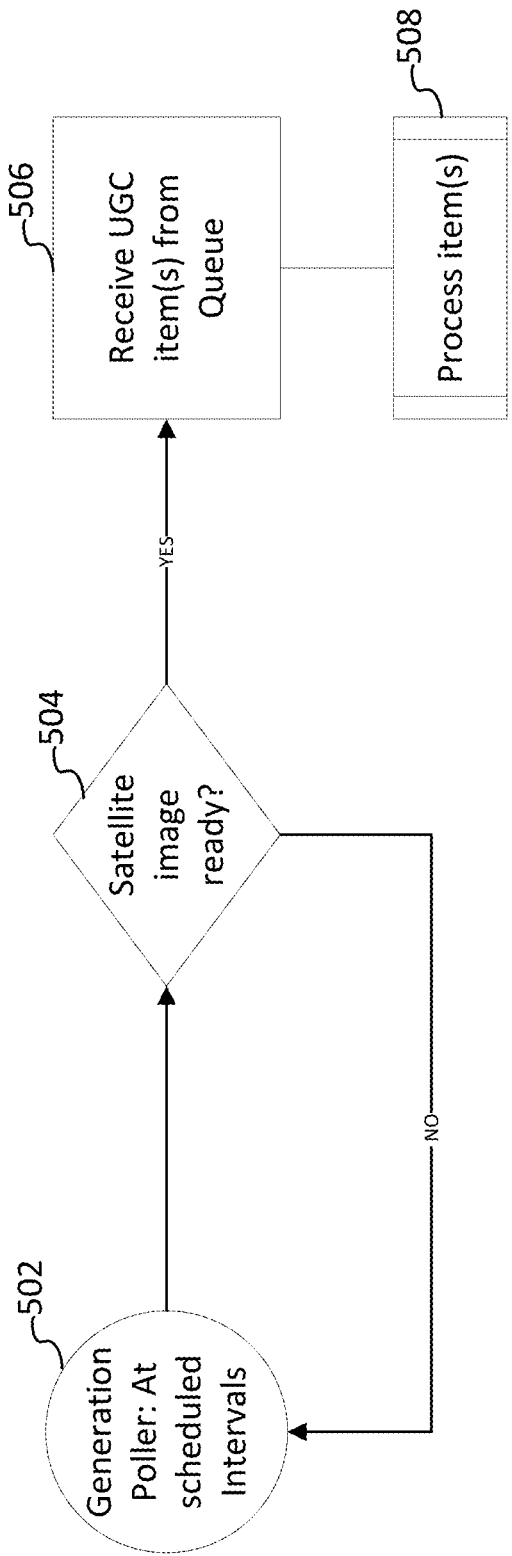
FIG. 5 schematically illustrates an operation of polling for remote sensing images that are ready for use in certain implementations of the present disclosure.

In certain embodiments, as illustrated in FIG. 5, the interface portal executes a "generation poller" routine of the processing application at scheduled intervals, step 502. The poller routine periodically determines whether one or more remote sensing (e.g. satellite) image is marked as ready, step 504. Where no satellite image is marked ready, the processing application returns to a monitoring state until the next polling occurs. In the case there is a remote sensing image ready, the scheduling process within, or external to, the processing application then accesses an application queue of UGC items and receives the or each UGC item held in the respective queue, step 506. Each UGC item is then processed along with a (ready) remote sensing image, step 508.

Figure 6:
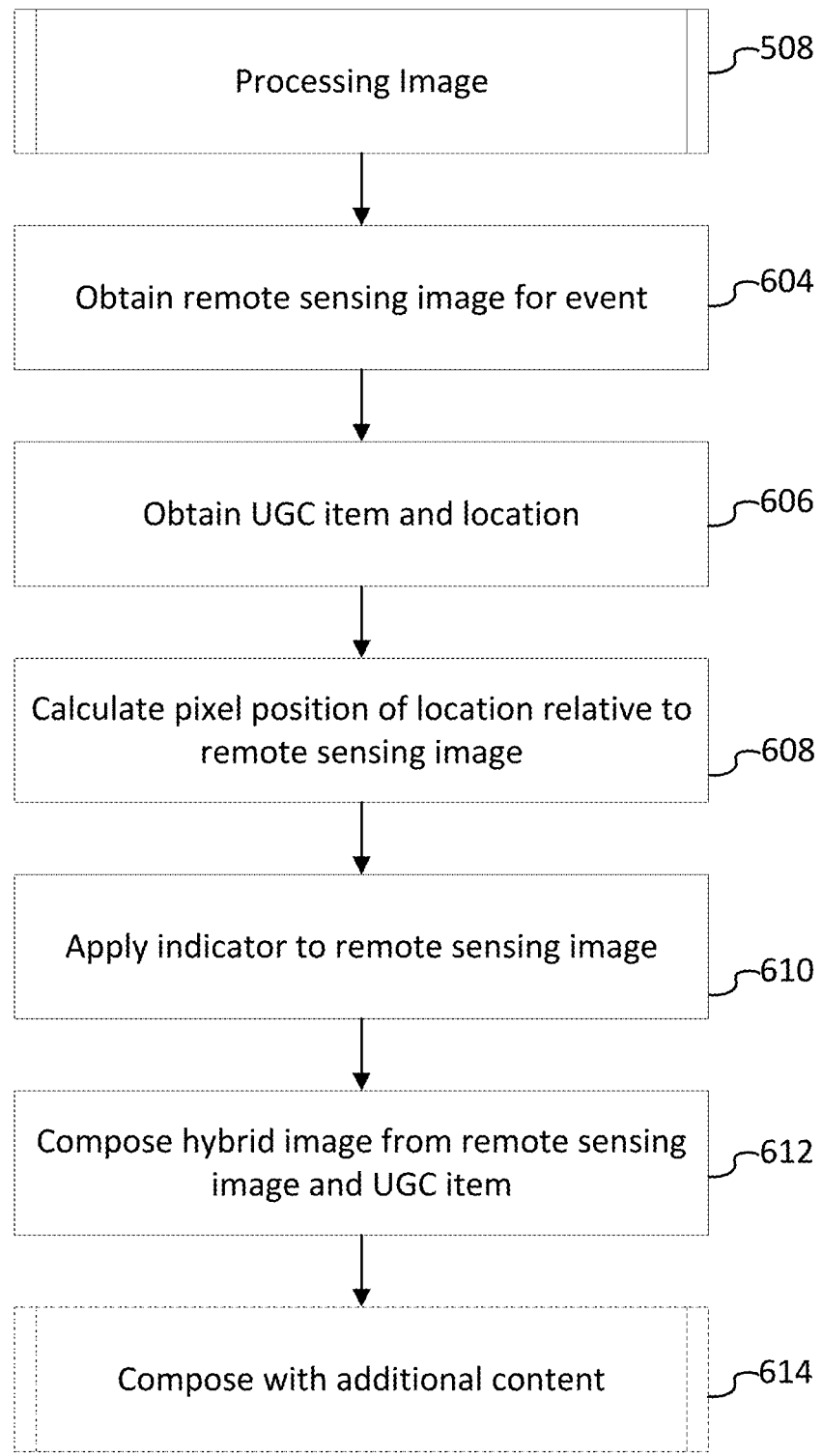
FIG. 6 schematically illustrates certain operations performed when processing user generated content items with remote sensing images in accordance with an aspect of the present disclosure.

A more detailed illustration of the process of FIG. 1, is shown in FIG. 6. FIG. 6 also details the operations performed in the interface portal at step 508 of FIG. 5.

The processing of the images is performed in by the processing application executing on the interface portal. At step 604, the processing application obtains a remote sensing image for an event (which may be the satellite image marked as ready and discovered at step 504). A UGC item is also obtained, step 606 (the UGC item having corresponding location information, in metadata for example). In FIG. 6, it is assumed that the UGC item is associated with the event shown in the remote sensing image: this may be because the UGC item includes a timestamp, location information and/or a user registration that correspond to the time range, remote-imaged region and/or register for that event.

The location associated with the UGC item is converted into a pixel location within the remote sensing image, step 608. Thus, the interface portal calculates the coordinates for the point in the remote-imaged region that corresponds to the geo-location where the UGC item was captured. For instance, where the UGC item is a selfie, the GPS location of the device taking the selfie when the selfie is taken is pinpointed on a satellite image of the region containing that GPS location.

An indicator, such as a flag, pin or target icon, is then imposed on the remote sensing image, step 610, so that the remote sensing image is displayed with the location from the UGC item visibly marked.

The image data from the remote sensing image is then composited with the data of the UGC item to generate a hybrid image, step 612. When displayed, the hybrid image is arranged to show at least a portion of the UGC item and at least a portion of the remote sensing image, marked to show the location from the UGC item.

Optionally, the processing application may construct a compound multimedia item by composing additional content with the hybrid image, step 614.

The construction of compound multimedia item may include inserting metadata from the event organiser and/or from a third party (such as a charity or sponsor or ticketing service). In certain examples, the additional content is an additional video sequence (such as a professional recording of a live performance of the band on stage at the time of the hybrid image). In certain examples, the additional content includes prepared text and/or graphical content (such as artwork) that may be used in a template for a compound multimedia item (converting the hybrid image into a personalised official record of event participation, for instance).

Figure 7:
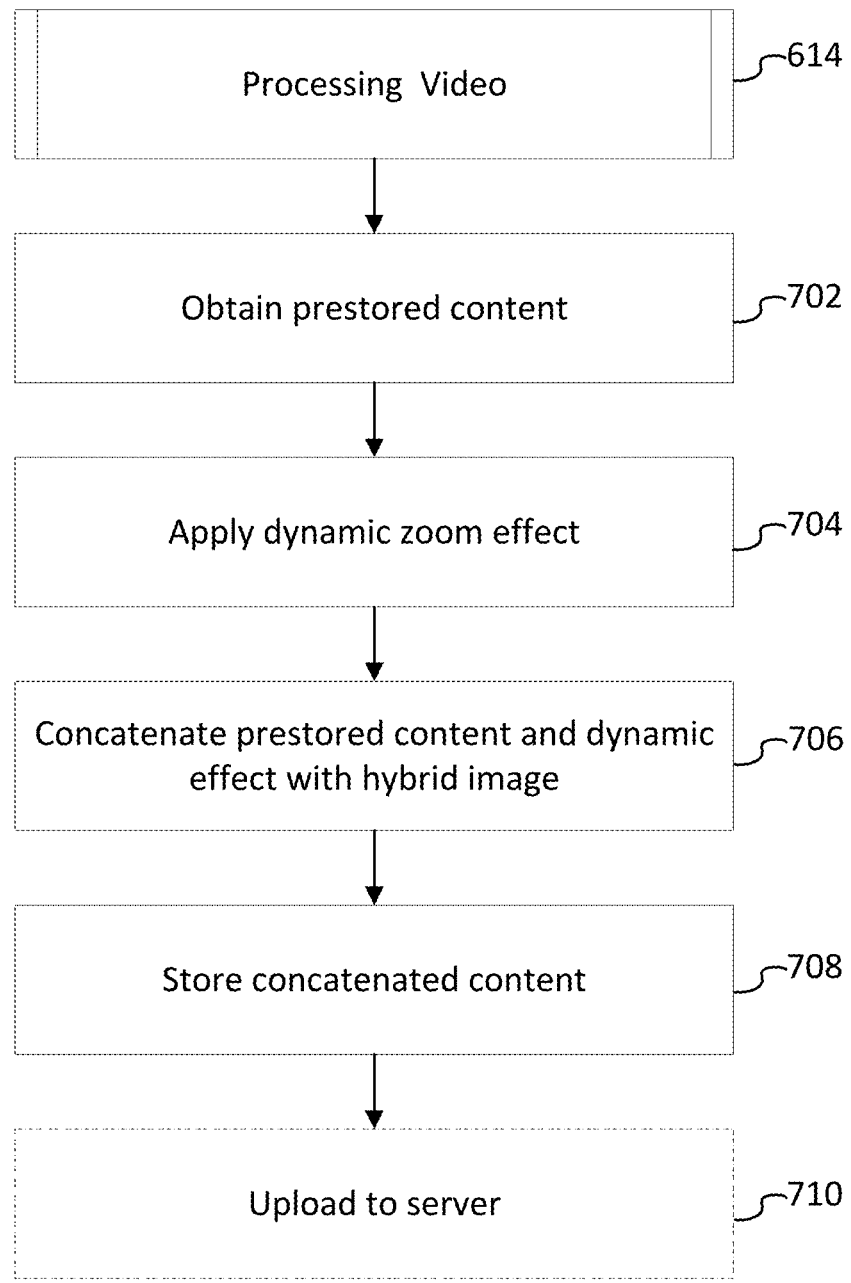
FIG. 7 schematically illustrates a case where additional content is combined with hybrid images generated from user generated content items merged with remote sensing images in accordance with an aspect of the present disclosure.

FIG. 7 illustrates a case where the optional additional content of step 614 include static video (for example a video "sting" applied to all hybrid images for a particular event or a promotional content item from an event sponsor or organiser) and provides a dynamic zoom effect. Static video content is received from a static content store (which may be local to the interface portal or external), step 702. Other examples of additional content include personalised messages, music, hyperlinks to further content and services and themes (i.e. backdrops, filters, etc.).

The remote sensing image may be viewed at a range of different magnifications. A dynamic zoom effect may be created by generating a plurality of views of a location depicted in the remote sensing image at successively high magnification and concatenating the views in order of increasing magnification as frames of a video sequence, step 704. The final frame may be made to correspond to the portion of the remote image containing the marked location now forming part of the hybrid image. The location of the UGC item may be marked in some or all of the preceding frames in the dynamic zoom sequence. For example, a video effect depicting a "zoom" from a view of the satellite image at relatively low magnification to a view of the portion of the satellite image surrounding the marked location at a predetermined high magnification may be prepended to a hybrid satellite and selfie image of an event so that the location of the selfie is given context in the low magnification (i.e. geographically wider) satellite view of the event.

The static video content, dynamic zoom effect "video" and hybrid image may then be assembled in a compound multimedia item, step 706. The compound multimedia item is then stored, step 708, and if necessary uploaded to a server, step 710, e.g. a video sharing service server from which registered users may share their video images for the event.

It is envisaged that, during any one event, there may one or more time slots at which a remote sensing image may be tasked to capture one or more remote sensing images. Furthermore, for mass-participation events, such as music festivals, sports events or national events, there will be a great number of UGC items captured by a similar number of different registered users. As the number of items and increases, it can be expected that the time taken to process each of these UGC items into hybrid images (or compound multimedia items) will increase. Assuming the processing and storage facilities are not infinite, this potential lag between UGC capture and delivery of a hybrid image ready for sharing needs to be managed.

Figure 8:
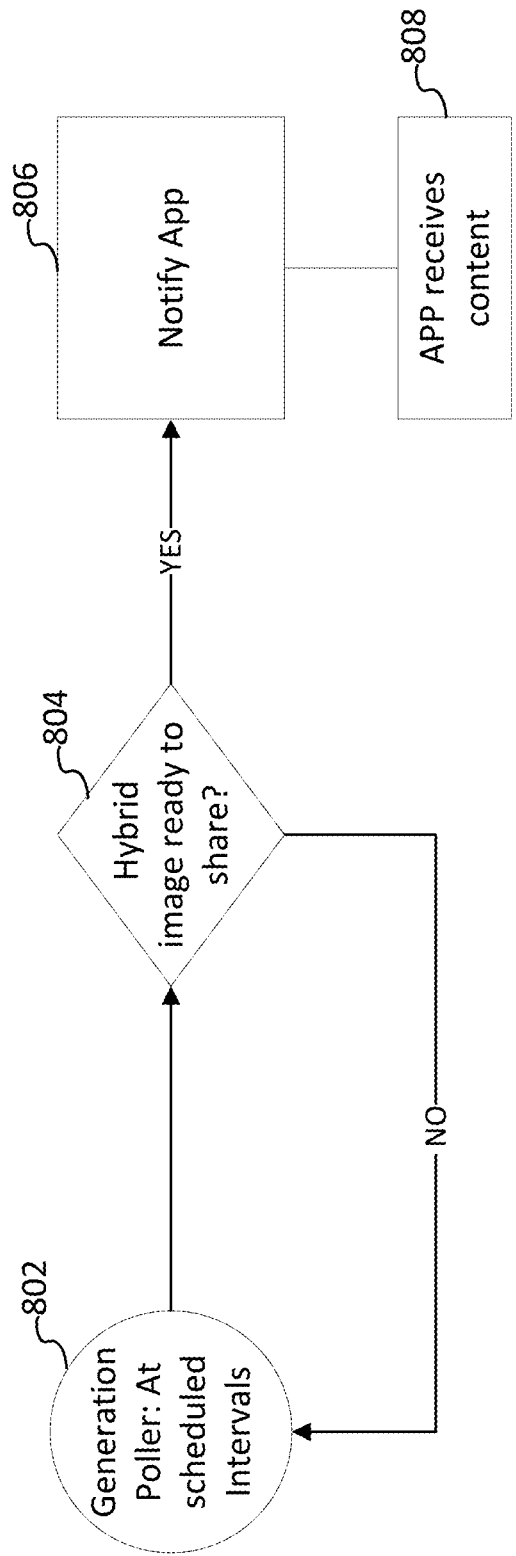
FIG. 8 illustrates a mechanism for managing the dissemination of the hybrid image content in accordance with an aspect of the present disclosure.

FIG. 8 illustrates one mechanism for managing the dissemination of the hybrid image content. A scheduling application polls the processing application at scheduled intervals (e.g. every n minutes, where n is whole number) to determine whether any given UGC item (or batch of such items) has been processed into one or more hybrid items, step 802. If one or more hybrid image determined to be ready to share (at step 804), a message is sent to the mobile application in the user device, step 806 (for example a push notification including a unique reference assigned to the hybrid image, whereby the hybrid image may be identified). When the mobile application receives the message, step 808, the user may download the hybrid image from the interface portal and view and/or share that hybrid image through the mobile application and/or an associated website.

Figure 9:
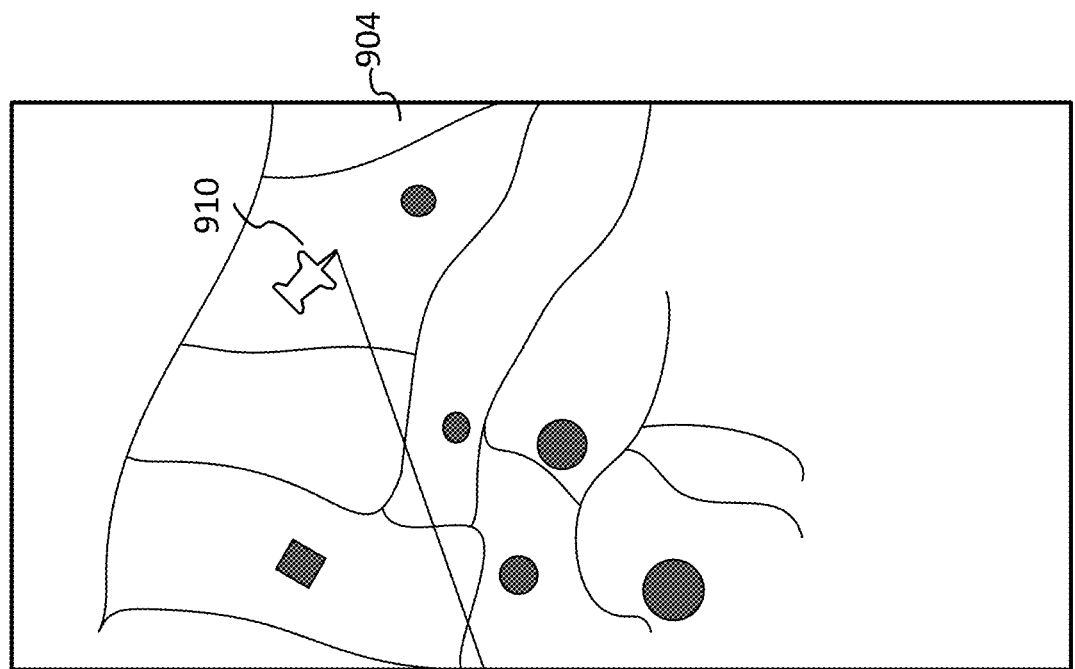
FIG. 9 depicts screen-views of a user interface presented by a mobile application in the implementation of an aspect of the present disclosure.
Figure 9:
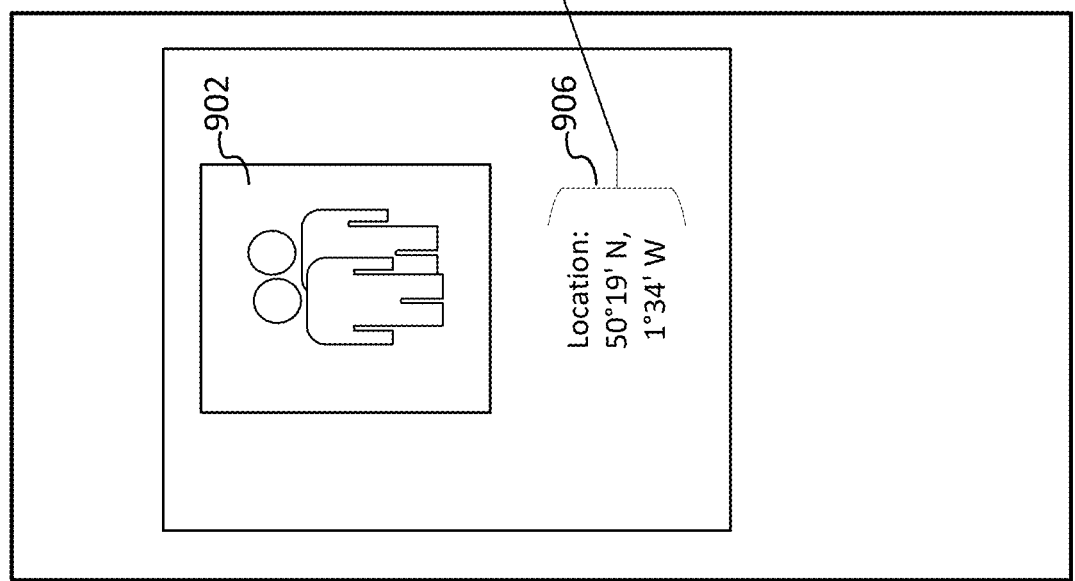

The user interface presented by the mobile application in a display of the user device is illustrated in FIG. 9. In a first screen-view 920a, the application shows an example of a captured UGC item 902 (e.g. a selfie image) and associated location information 906 (representing the geographical location of the user device at the time the UGC item was captured).

In a second screen-view 920b, a portion of a remote sensing image 904 is displayed. The location information 906 is represented as a pin 910 at a corresponding point in the remote sensing image 904.

Figure 10:
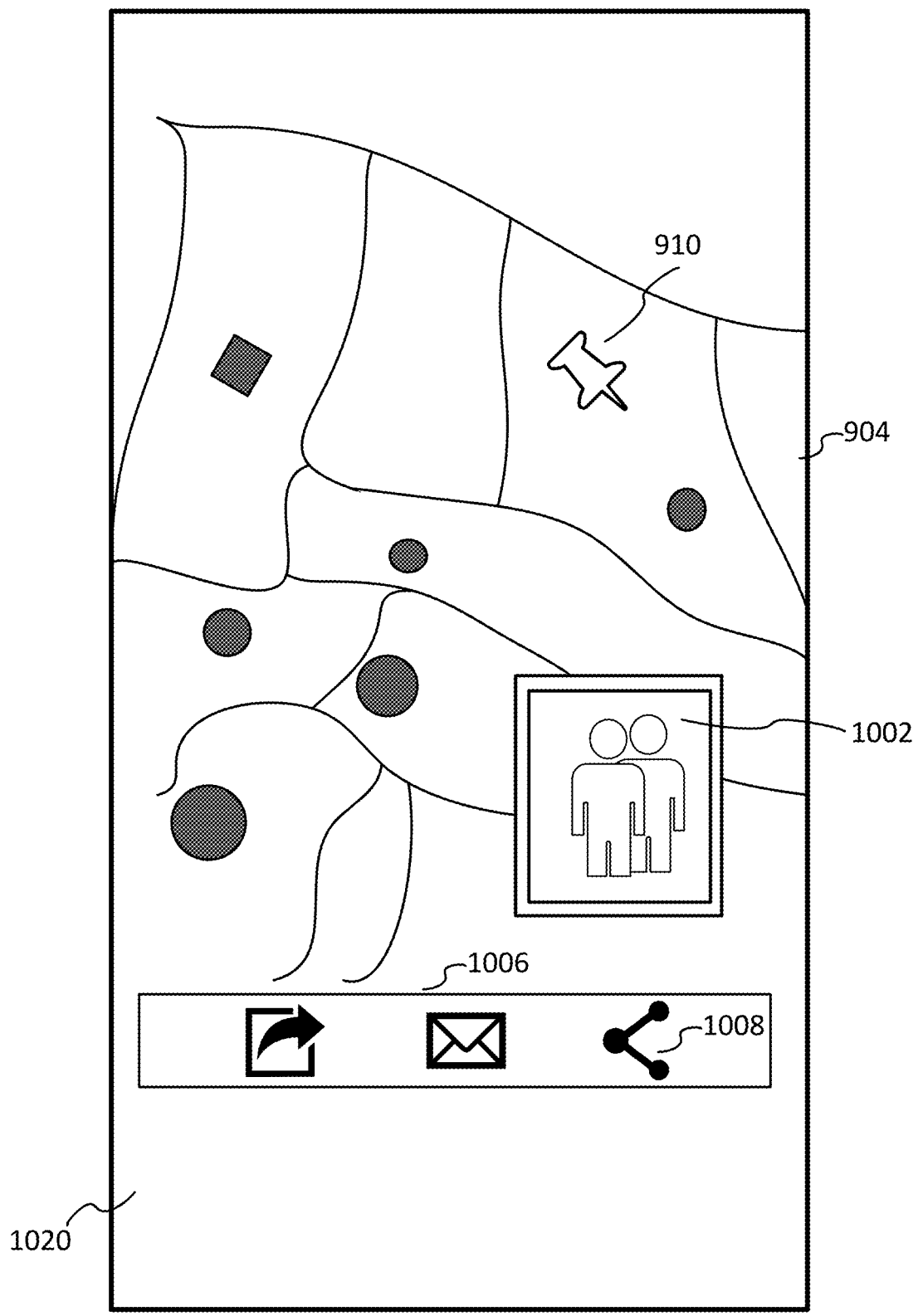
FIG. 10 illustrates a further screen-view of a user interface presented by a mobile application in the implementation of an aspect of the present disclosure.

FIG. 10 illustrates an example screen-view 1020 of a hybrid image generated from remote sensing image 904 marked with pin 910 at a location corresponding to the location 906 at which UGC item 902 was captured and overlaid with an inset scaled-down image 1002 corresponding to the UGC item 902. In the illustrated example, an overlaid user interaction box 1006 is displayed, showing various additional functions (represented as icons) the mobile application may offer such as the possibility to download the image or to attach it to a message such as an email. The mobile application may integrate with a hybrid image sharing service, in which case a sharing option 1008 may be provided to facilitate sharing across the sharing service.

Figure 11:
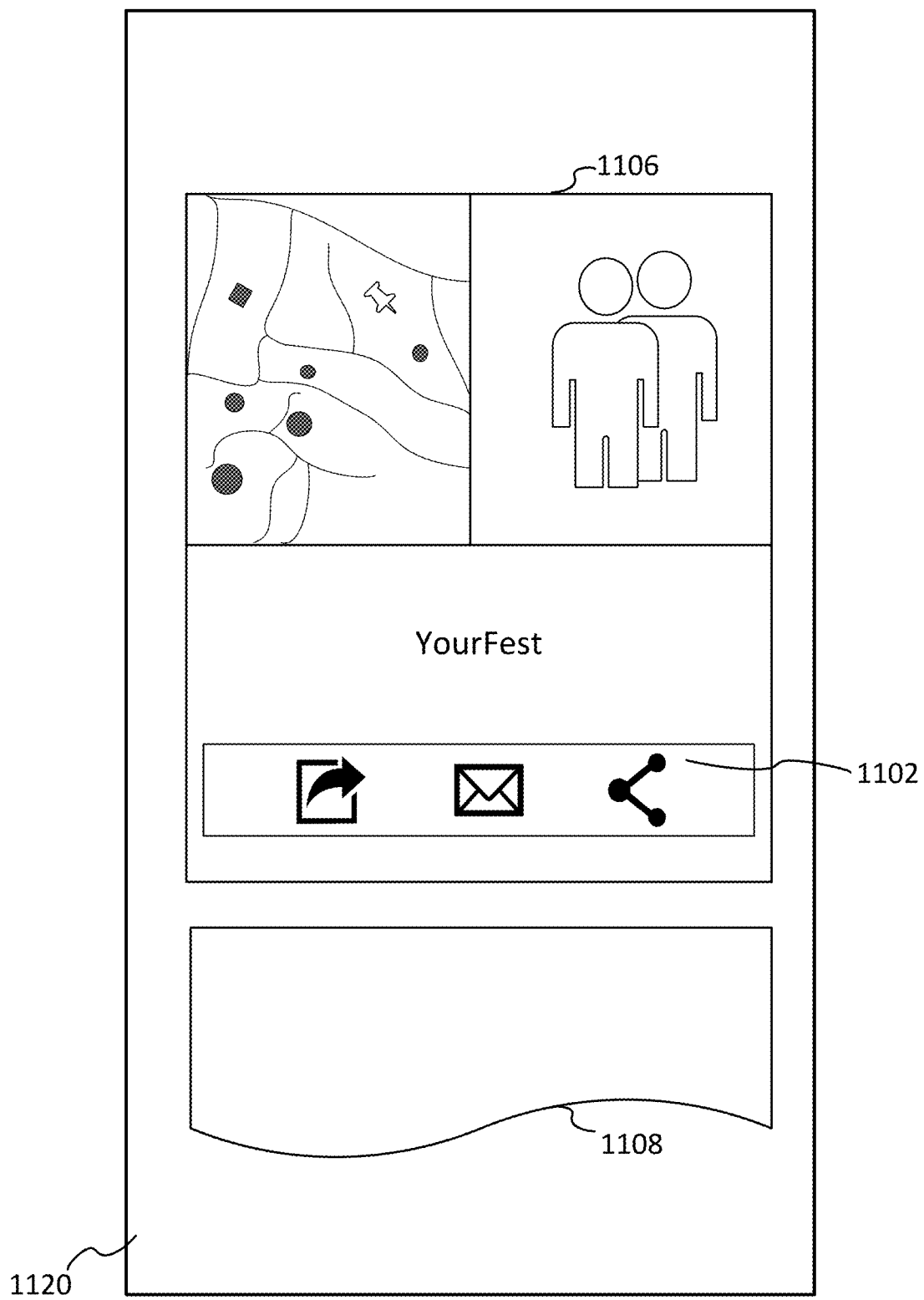
FIG. 11 illustrates yet another screen-view of a user interface presented by a mobile application in the implementation of an aspect of the present disclosure.

When the user wishes to recall an event, a record of the hybrid image from that event may form part of a compound multimedia item stored in the user device and accessible through the mobile application. FIG. 11 illustrates a screen-view 1120 displaying an item 1106 (relating to an event called YourFest) and a further item 1108 (relating to another hybrid image related to the same event or a different event). Here the displayed items may be displayed showing reduced scale versions, or "thumbnails", of the constituent UGC item and remote sensing image. The displayed item may include a overlaid user interaction box 1102 presenting various additional functions (represented as icons) that the user may trigger without opening the compound multimedia item in the mobile application.

Figure 12:
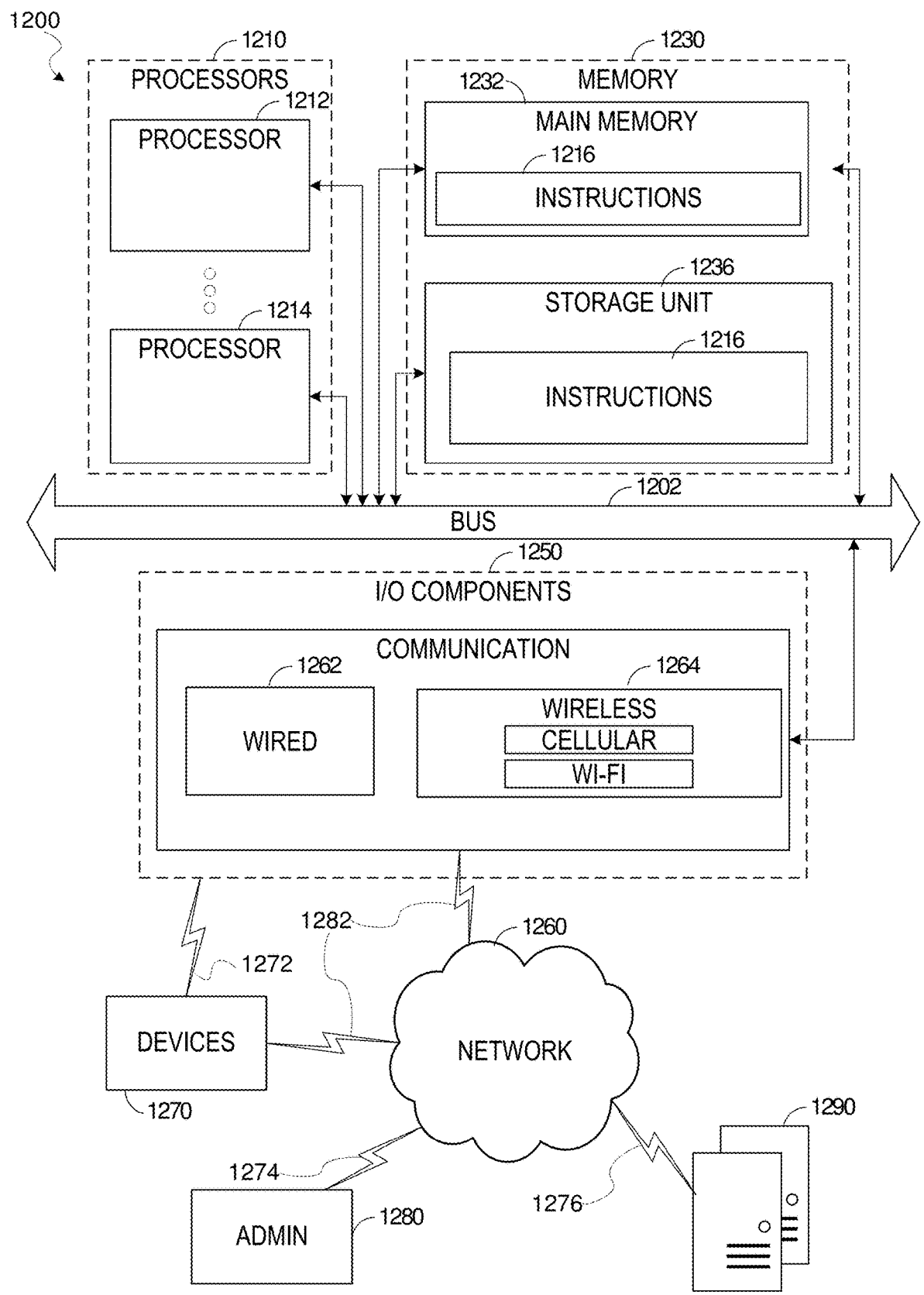
FIG. 12 schematically illustrates certain functional elements of an interface portal in accordance with a further aspect of the present disclosure.

The interface portal 204 of FIGS. 2A and 2B may be implemented as a server 1200, as shown in FIG. 12. The interface portal may be implemented as a distributed network of such servers.

The interface portal 1200 includes: a processing unit 1210, which itself includes at least one processor (here, a plurality of processors 1212, 1214); a memory unit 1230; input/output components 1250; and a bus 1202, through which each of the components of the interface portal are communicatively connected.

The memory unit 1230 includes at least one memory device. FIG. 12 shows the memory unit 1230 with both a main memory 1232 and a storage unit 1236. Examples of main memory include volatile RAM, whereas examples of storage unit include non-volatile hard disk and solid-state memory devices. Instructions 1216 for the operation of the processing unit are stored in at least one of the volatile and non-volatile memory devices of the memory unit.

The input/output components 1250 include at least one communication unit: examples of communication unit include wired communication units 1262, such as a network interface card, NIC, for wired ethernet connectivity, and wireless communication elements 1264, such as 2G/3G/4G/5G cellular and/or WiFi modules.

The interface portal 1200 may communicate with one or more user devices 1270 via a direct communication link 1272 or indirectly 1282 via a network 1260, such as the Internet. The interface portal 1200 may also communicate with an administration server 1280 (via the network 1260 and communication link 1274. Communication with other external systems 1290, including the ground station servers of a satellite operating company, social network and sharing service servers, advertisement servers, presence servers, static video servers, etc., is provided by respective communication links 1276 via the network 1260.

The description of the various embodiments of the present disclosure has been presented for purposes of illustration and example, but is not intended to be exhaustive or to limit the invention to the forms disclosed. It will be appreciated by those skilled in the art that changes could be made to the embodiments described above without departing from the broad inventive concept thereof.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A computer-implemented method comprising:
   receiving at least one remote sensing image of a predetermined geographical area from an image capture device carried on a satellite platform, the image capture device having been tasked to capture the at least one remote sensing image within a predetermined time slot;
   obtaining a user-generated content, UGC, item, the UGC item having an associated location within the geographical area and having been captured at a user-determined time within the time slot; and
   merging the UGC item and the remote sensing image to form a hybrid image.

2. The method of claim 1, wherein the UGC item includes at least one of user generated location information, a user generated still image, a user generated video image; a user generated audio and wearable sensor data.

3. The method of claim 2, wherein the UGC item is a selfie image.

4. The method of claim 1, the method further including obtaining ambient audio data, and wherein the UGC item further includes the ambient audio data.

5. The method of claim 1, the method further including obtaining at least one additional remote sensing image.

6. The method of claim 5, wherein the at least one additional remote sensing image is obtained from a further image capture device.

7. The method of claim 6, wherein said further image capture device is hosted by a second platform different from the satellite platform.

8. The method of claim 7, wherein the second platform is one of: a second satellite platform; a UAV platform; and a manned aircraft platform.

9. The method of claim 1, wherein merging comprises:
   processing the remote sensing image into a map projection, to compensate for viewing angle of satellite;
   converting the location associated with the UGC item into a pixel location within the processed remote sensing image; and
   imposing a visible indicator on the processed remote sensing image at the pixel location.

10. The method of claim 1, the method further including constructing a compound multimedia item by composing additional content with the hybrid image.

11. The method of claim 10, further comprising obtaining an historical remote sensing image of the geographical area, wherein the additional content includes the historical remote sensing image.

12. The method of claim 10, wherein the additional content includes at least one of:
   metadata;
   additional pre-generated video content;
   additional pre-generated audio content;
   prepared text content;
   prepared graphical content;
   visual effects; and
   user generated content shared by other users.

13. A portal device having at least one processor and at least one communication unit, wherein the at least one communication unit is configured to receive at least one remote sensing image of a predetermined geographical area from an image capture device carried on a satellite platform, the image capture device having been tasked to capture the at least one remote sensing image within a predetermined time slot; and
   to obtain a user-generated content, UGC, item, the UGC item having an associated location within the geographical area and having been captured at a user-determined time within the time slot; and
   wherein the at least one processor is configured to merge the UGC item and the remote sensing image to form a hybrid image.

14. A non-transitory machine-readable medium carrying a set of instructions that, when executed by at least one processor, causes the at least one processor to carry out the method of claim 1.

* * * * *